Feb. 11, 1969　　　R. H. WISE　　　3,426,386
LOCKING DEVICE FOR PIVOTED MEMBERS
Filed Jan. 5, 1967　　　　　　　　　　　　　Sheet 1 of 2
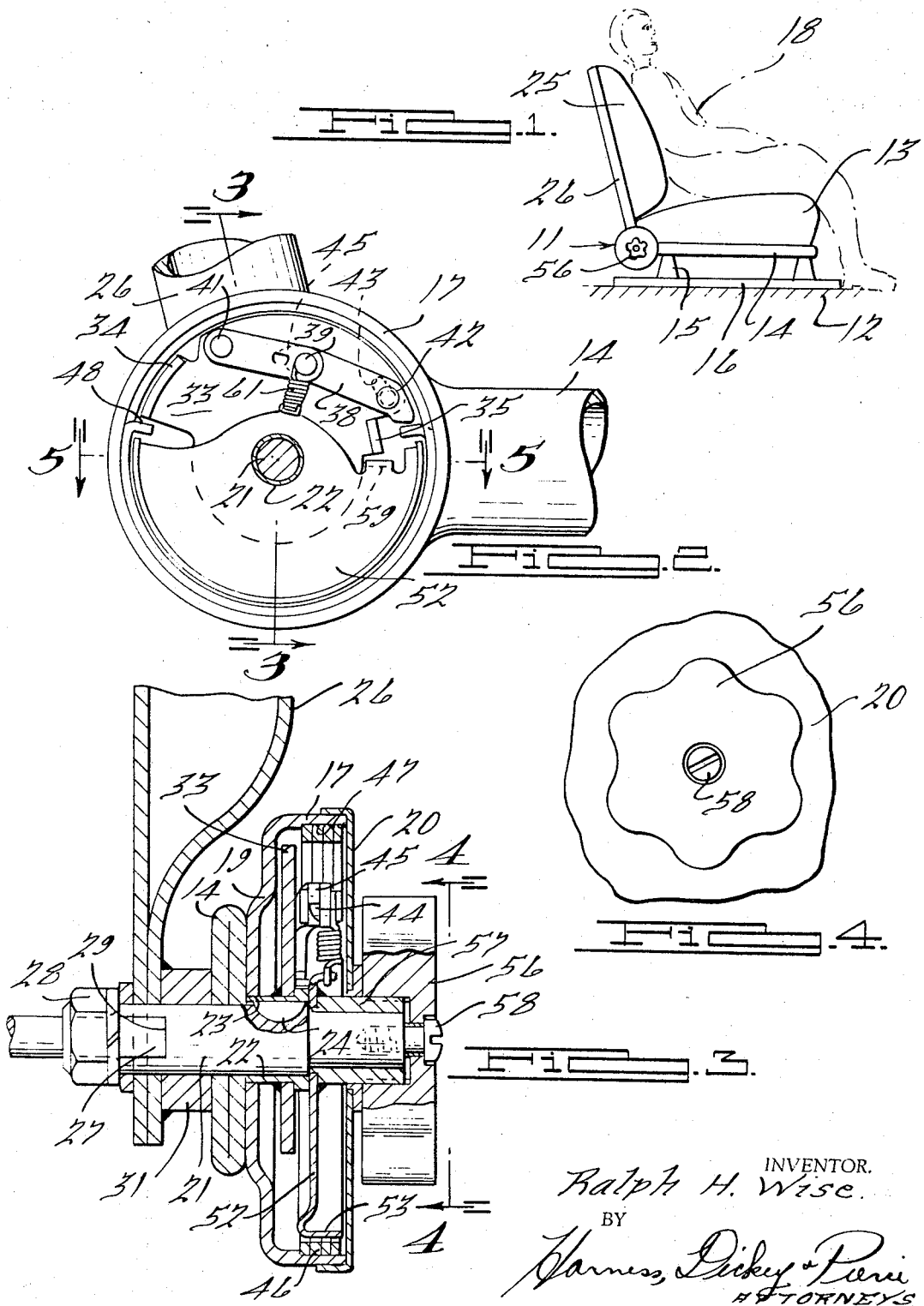
INVENTOR.
Ralph H. Wise.
BY
Harness, Dickey & Pierce
ATTORNEYS

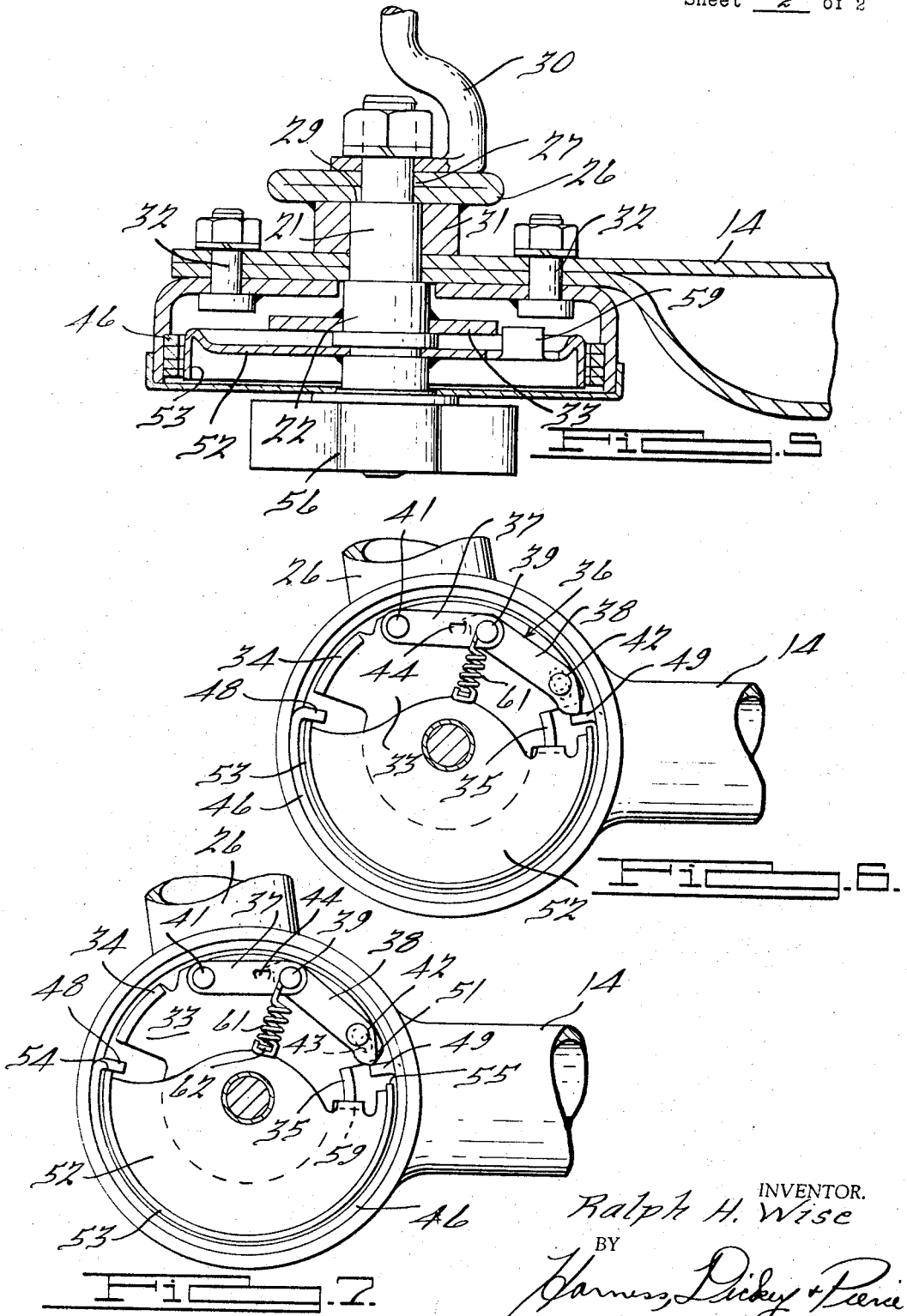

United States Patent Office 3,426,386
Patented Feb. 11, 1969

3,426,386
LOCKING DEVICE FOR PIVOTED MEMBERS
Ralph H. Wise, Dearborn, Mich., assignor of fifty percent to Vernon Duke, Columbus, Ind.
Filed Jan. 5, 1967, Ser. No. 607,513
U.S. Cl. 16—140   3 Claims
Int. Cl. E05b 11/08; A47c 3/00

This invention relates to locking devices for pivoted members, and more particularly to locking devices which permit the pivoted member to be adjusted to an infinite number of positions. Such devices are useful in many installations where it is desired to pivotally adjust one member with respect to another and to lock such member against rotation in one direction after it is set in its adjusted position, while still permitting the member to be moved in the opposite direction. For example, one possible use of such a device is in automotive seat installations whereby the front seat back may be locked at any desired angle against rearward pivotal movement (with the lock being releasable by means of a handle) but may be swung forwardly by pressing on the back itself, against a predetermined resistance, to any newly adjusted position at which will again be locked against rearward movement.

It is an object of the invention to provide a novel and improved locking device of this character which is of relatively simple and economical construction, is compact and reliable in use, and requires little or no maintenance.

It is a further object to provide an improved locking device of this nature in which the variety of adjustment positions is infinite, regardless of whether the adjustment is made by the adjustment handle or by swinging of the pivoted member itself in its override direction.

Other objects, features and advantages of the present invention will become apparent from the subsequent description and the appended claims, taken in conjunction with the accompanying drawings, in which:

FIGURE 1 is a schematic side elevational view of an automotive front seat showing the manner in which the invention could be installed to control adjustment of the seat back;

FIGURE 2 is a cross-sectional view of the device viewed in the same direction as FIGURE 1;

FIGURE 3 is a cross-sectional view taken along the line 3—3 of FIGURE 2 and showing the manner in which the parts are interconnected;

FIGURE 4 is a fragmentary elevational view taken along the line 4—4 of FIGURE 3 and showing the location of the adjustment handle;

FIGURE 5 is a cross-sectional plan view taken along the line 5—5 of FIGURE 2;

FIGURE 6 is a view similar to FIGURE 1 showing the toggle linkage in folded position after having engaged the locking spring, the spring release actuating tab on the adjustable plate engaging the spring releasing plate; and FIGURE 7 is a view similar to FIGURE 6 but showing the position of the parts after the adjustable plate has been rotated clockwise but before it is urged back into its new locked position.

Briefly, the illustrated embodiment of the invention comprises a circular housing secured to a fixed member and surrounding a pivot for an adjustable member which extends outwardly therefrom. A spiral spring having inturned ends is disposed within said housing and engages the inner surface of its cylindrical wall. An adjustable plate is fixed to the pivot and rocks with the adjustable member.

This adjustable plate has a lock tab engageable with one of the inturned spring ends in such manner that it tends to expand the spring against the housing wall, thus frictionally locking the spring to the housing and preventing movement of the adjustable member in one direction.

A toggle linkage is carried by the adjustable plate, the outer end of one link of the toggle linkage being pivoted to the adjustable plate, the outer end of the other link being adjacent the other inturned spring end.

A spring releasing plate is rotatably mounted on the pivot, and the two radial edges of this arcuate plate are alternately engageable with the inturned spring ends in such manner as to draw the spring away from the housing wall, thus releasing it from its frictional locking engagement.

A spring release actuating tab is formed on the adjustable plate, this tab being engageable with said releasing plate when the adjustable member is rotated in a direction opposite that which causes the locking tab to engage the spring. Thus, the spring releasing plate will engage the spring, releasing it from its frictional locking engagement with the housing and permitting the adjustable member to be moved in said direction. A tension spring is connected between the center pivot of the toggle and a portion of the spring releasing plate, and the collapsing of the toggle when it engages the locking spring will be resisted by this tension spring. Thus, a person rotating the adjustable member in its override direction will have to overcome a predetermined force; namely, the force necessary to elongate the tension spring.

A handle in the form of a rotatable knob is fixed to the center of the spring releasing plate. By rotation of this handle in either direction, the spring releasing plate will be caused to engage one or the other of the inturned spring ends. The adjustable member may then be adjusted in either direction.

Referring more particularly to the drawings, the locking device is generally indicated at 11 in FIGURE 1 and is shown as forming part of automotive front seat installation. The floor of the automobile is indicated at 12, and the front seat cushion is indicated at 13, the cushion having a frame 14 supported by stanchions 15. These stanchions may be supported by a seat track 16 for adjusting the seat forwardly or rearwardly, but for purposes of the present description we may assume that seat frame 14 is stationary.

A cylindrical housing 17 forms part of locking device 11 and is secured to the rearward end of frame 14 adjacent one corner thereof. In FIGURE 1, the housing is shown as being on the right hand side of a seated passenger 18, it being assumed that the seat is an individual or "bucket type" front seat. In the case of the left hand front seat, or of a bench type front seat, the locking device 11 would be located on the left hand side of the driver.

Housing 17 is on a horizontal axis, and comprises an end wall 19 as seen in FIGURE 3, the side of the housing opposite end wall 19 having a cover 20. A shaft 21 extends through wall 19 and cover 20, the shaft having a bushing 22 rotatably supported by an apertured portion 23 of wall 19. A key 24 connects bushing 22 with shaft 21, the main portion of the bushing being within housing 17, that portion of shaft 21 extending through end wall 19 in FIGURE 3 passing through fixed member 14 and being rotatably supported thereby.

Seat back cushion 25 has a frame 26, one lower corner of which is secured to shaft 21 by noncircular portions 27 on the shaft and by a nut 28 threaded onto the end of the shaft. This nut draws frame 26 against the bottoms 29 of flattened portions 27. A torque rod 30 may be provided connecting the end of frame 26 secured to shaft 21 to the other side of frame 14 (not shown). A spacer 31 is welded to frame 26 and is disposed between this frame and frame 14. Wall 19 of housing 17 is secured to frame 14 on the opposite side of spacer 31 by bolts 32, as seen in FIGURE 5.

An adjustable plate 33 is disposed within housing 17 and is secured to shaft 21 by being welded to bushing 22.

This plate has an irregular shape, as seen in FIGURES 2, 6 and 7, with the lower portion thereof being arcuate and having a relatively small diameter, and the upper portion being wider, with its outer edge adjacent the inside of housing 17. The left hand side of plate 33, as seen in FIGURES 2, 6 and 7, has a locking tab 34 extending laterally therefrom. The right hand side of plate 33 has a lateral spring release actuating tab 35, this tab being closer to the pivot axis than is tab 34.

A toggle linkage indicated generally at 36 in FIGURE 6 is carried by the upper portion of plate 33. This linkage comprises a first link 37 and a second link 38 having overlapping portions pivotally connected by a pin 39. The outer end of link 37 is pivotally connected to plate 33 adjacent tab 34 by a pin 41. The outer end of link 38 is slidably connected to plate 33 adjacent tab 34 by a headed pin 42 secured to the link and extending through an elongated slot 43 in plate 33.

Link 37 has an outwardly pressed tab 44 adjacent the inner end thereof, and link 38 has a nose 45 engageable with the tab 44 to limit the radially inward movement of pivot pin 39, as seen in FIGURE 2. This limiting position is such that the axis of pin 39 will be radially outwardly of a line extending between the axes of pins 41 and 42.

A helical spring 46 is disposed within housing 17 and engages the inner surface 47 thereof as seen in FIGURE 3. This spring has a rectangular cross-sectional shape and therefore a substantial surface area engaging surface 47 of the housing, the spring having several convolutions. The unstressed shape of spring 46 is such that its outer diameter will be greater than the diameter of surface 47, so that when disposed within housing 17 the spring will tend to expand and frictionally engage surface 47.

A first tab 48 extends inwardly from one end of spring 46 adjacent tab 34 of plate 33, and a second tab 49 extends inwardly from the other end of spring 46 in obstructing relation with a projection 51 at the outer end of link 38.

A spring releasing plate 52 is also disposed within housing 17, this plate being inside the lower portion of spring 46 and having an arcuate shape, as seen in FIGURES 2, 6 and 7. Plate 52 is rotatably supported and has an axially extending flange 53 immediately inwardly of spring 46, one end 54 of this flange being engageable with tab 48 while the other end 55 is engageable with tab 49. The arcuate distance between ends 54 and 55 is slightly less than the arcuate distance between tabs 48 and 49 so that there is slight play of plate 52 when moving between the position of FIGURE 7, where edge 54 engages tab 48, and a position where edge 55 engages tab 49.

A handle or knob 56 is secured to plate 52 by means of a bushing 57 secured to handle 56 by a screw 58 and welded to plate 52, bushing 57 being rotatably mounted on shaft 21. Rotation of plate 52 by handle 56 in either direction will serve to release spring 46 from its frictional engagement from its housing 17. This is because engagement of either tab 48 in a clockwise direction or tab 49 in a counterclockwise direction will tend to coil up spring 46, narrowing its diameter and releasing it from its engagement with surface 47.

Spring 46 normally serves as a locking spring and it prevents counterclockwise movement of adjustable plate 33 and its attached frame 26. This is due to engagement of 34 with tab 48, which will tend to expand spring 46 against surface 47, locking the spring against angular movement. This in turn will effectively lock plate 33 and therefore frame 26 against counterclockwise or rearward movement as seen in FIGURE 1.

Plate 52 is further provided with a tab 59 adjacent edge 55 and disposed inwardly therefrom. Tab 59 is in the path of tab 35 on plate 33 when this plate is rocked clockwise in FIGURES 2, 6 and 7. Such engagement will therefore cause rotation of spring releasing plate 52 in a clockwise direction so that its edge 54 will engage tab 48 of the spring, withdrawing the spring from its frictional engagement with the housing. Thus, rocking of frame 26 in a clockwise direction in FIGURES 1, 2, 6 or 7 will result in release of the locking spring and permit adjustment of the seat back 25 to move it to a forward position.

A helical coil tension spring 61 is provided, this spring being connected at one end to pin 39 and at the other end to a tab 62 at the upper portion of plate 52. Engagement of nose 51 of link 38 with tab 49 of spring 46, when plate 33 is rocked clockwise from its FIGURE 2 to its FIGURE 6 position, will cause toggle linkage 36 to collapse in a manner such that pin 39 moves radially outwardly. This will tension spring 61, so that this movement of frame 26 must overcome the tensioning of spring 61.

In operation, frame 26 will normally be set to a particular adjusted position by rotation of handle 56, which will release spring 46 and permit the frame to be rocked to its selected position. After handle 56 is released, frame 26 will be locked against rearward movement by the engagement of tab 34 with tab 48.

If it is desired to move seat frame 26 forwardly, this may be done without grasping handle 56 if desired. One need merely push frame 26 to the right as seen in FIGURE 1, and the above described action of toggle linkage 36 will take place. In other words, the toggle linkage will collapse as nose 51 engages tab 49 and the tension of spring 61 is overcome, and further movement will cause spring release actuating tab 35 to engage tab 59 of spring releasing plate 52. This will move the spring releasing plate clockwise as seen in FIGURES 6 and 7, causing end 54 of flange 53 to engage tab 48 of the spring. The spring will thus be released from its frictional engagement with the housing and the seat frame 26 may continue to be moved forwardly to the position desired.

Upon release of spring frame 26, the parts will assume their normal position as seen in FIGURE 2, and frame 26 will be locked against rearward movement from its newly adjusted position by the engagement of tab 34 with tab 48.

If it is desired to move frame 26 rearwardly, handle 56 is grasped and plate 52 rotated in a counterclockwise direction as seen in FIGURES 2, 6 and 7. This will cause end 55 of flange 53 to engage tab 49, releasing the spring from frictional engagement with the housing and causing it to rotate in a counterclockwise direction. Tab 34 will follow tab 48 and when handle 56 is released, seat back frame 26 will again be locked in its newly adjusted position.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a locking device for pivoted members, a fixed cylindrical housing, a helical spring disposed within said housing and normally engaging the inner surface thereof, the ends of said spring having first and second inwardly extending tabs, an adjustable plate rotatably mounted within said housing, a locking tab on said adjustable plate facing the first tab on said spring, and engageable therewith upon rotation of said adjustable plate in one direction in such manner as to expand said spring against said housing, thereby locking the adjustable plate against further rotation, and a spring releasing plate rotatably mounted within said housing and having ends facing said spring tabs in such manner that a rotation of said spring releasing plate in either direction will withdraw said spring from frictional locking engagement with said housing, thereby permitting said adjustable plate to be rotated.

2. The combination according to claim 1, further provided with a spring release actuating tab on said adjustable plate, said last-mentioned tab being engageable with a portion of said spring releasing plate upon rotation of said adjustable plate in a direction opposite that in which it is locked by said locking tab, whereby further rotation of said adjustable plate in said last-mentioned direction will cause said spring releasing plate to engage and release said spring from frictional locking engagement with said housing.

3. The combination according to claim 2, further provided with a toggle linkage carried by said adjustable plate and having a first link the outer end of which is pivoted to said adjustable plate, a second link pivoted to said first link, the outer end of said second link having a pin-and-slot connection with said adjustable plate, and a projection on the outer end of said second link engageable with said second tab on said locking spring, a coil spring connected to the juncture of said links and urging the links toward a limiting position, means on said links defining said limiting position as one in which the pivoted connection between the links is radially outwardly of a line connecting the outer ends of the links, whereby rotation of said adjustable plate in said other direction will cause engagement of said second link projection with said second locking spring tab and collapsing of said toggle linkage against the action of said spring, further movement of said adjustable plate in said other direction thus causing said spring release actuating tab to engage said spring releasing plate.

References Cited

UNITED STATES PATENTS 3,216,766  11/1965  Tabor _____ 297—379

JAMES T. McCALL, *Primary Examiner.*

D. L. TROUTMAN, *Assistant Examiner.*

U.S. Cl. X.R.

297—379